O. H. ELBRECHT.
APPARATUS FOR HEATING AND APPLYING LIQUIDS.
APPLICATION FILED MAY 25, 1908.
954,945.
Patented Apr. 12, 1910.
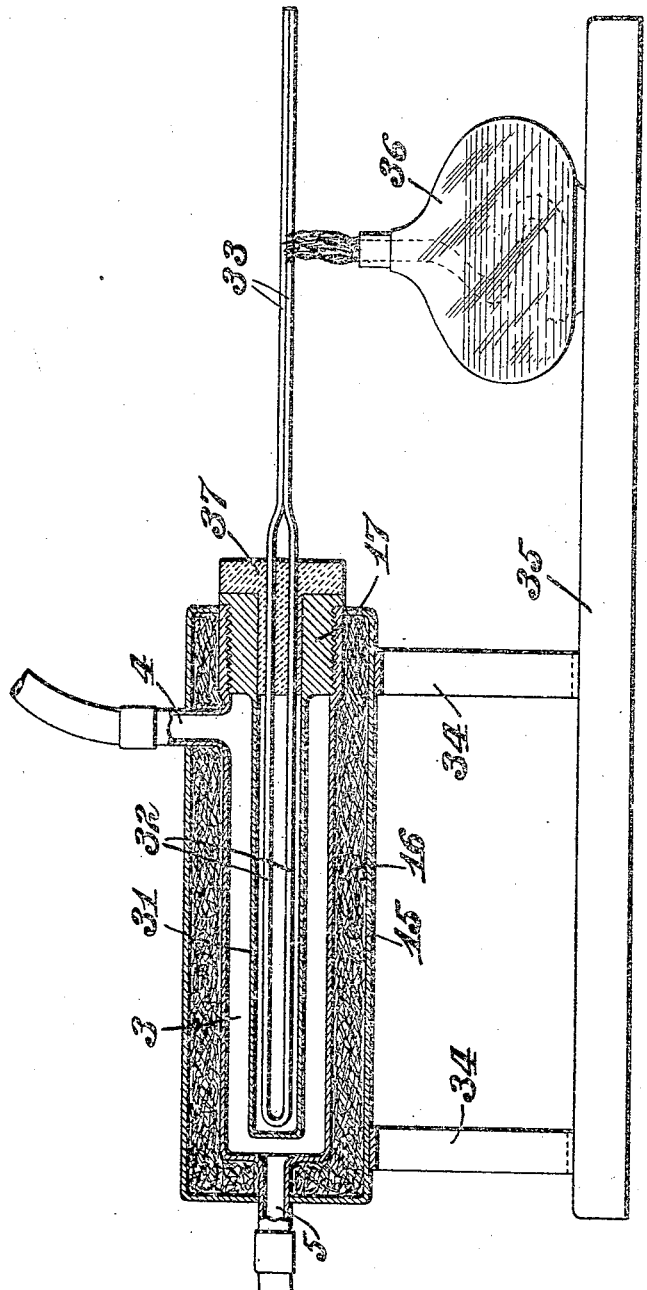
Witnesses:
G. A. Pennington
J. B. Megown
Inventor:
Oscar H. Elbrecht
By Cavart Cave,
Attys.

UNITED STATES PATENT OFFICE.

OSCAR H. ELBRECHT, OF ST. LOUIS, MISSOURI, ASSIGNOR TO THE MEIER DENTAL MANUFACTURING COMPANY, OF ST. LOUIS, MISSOURI, A CORPORATION OF MISSOURI.

APPARATUS FOR HEATING AND APPLYING LIQUIDS.

954,945.   Specification of Letters Patent.   Patented Apr. 12, 1910.

Application filed May 25, 1908. Serial No. 434,782.

*To all whom it may concern:*

Be it known that I, OSCAR H. ELBRECHT, a citizen of the United States, and a resident of the city of St. Louis and State of Missouri, have invented a new and useful Apparatus for Heating and Applying Liquids, of which the following is a specification.

This invention relates to apparatus to facilitate the application of heated liquids and solutions in medical and surgical practice.

It has for its principal objects to heat the liquid or solution and to maintain the same at an even temperature, to provide for the regulation of the heating element, to provide for the convenient manipulation of the apparatus, to secure cleanliness and guard against infection, and to attain certain other advantages hereinafter more fully appearing.

Heated saline and other solutions are now successfully used in the treatment of certain medical and surgical cases. It is essential that the solution be maintained at an even temperature to attain good results. My apparatus, therefore, is designed particularly to facilitate the application of such treatments.

The invention consists in the parts and in the arrangements and combinations of parts hereinafter described and claimed.

In the accompanying drawings the figure is a view partly in elevation and partly in section showing an apparatus arranged according to my invention.

The apparatus comprises a heating chamber 3, preferably cylindrical which is provided with an inlet pipe 4 at one end and an outlet pipe 5 at its opposite or discharge end. A flexible pipe 6 is connected to the outlet pipe 5 and is adapted for connection to a nozzle (not shown). A heating unit or core 31 is mounted centrally in the heating chamber 3, so that a space is provided all around said unit. Surrounding the heating chamber 3, is a closed casing 15 which is spaced therefrom. The space between the chamber and casing is filled in with asbestos or other suitable insulating material 16. The end of the heating chamber 3, has a screw threaded opening adapted to receive a screw plug or enlargement 17 on which the heating unit is mounted.

The heating unit is heated from a flame, and comprises a tubular casing 31 in which is looped a metallic strip or wire 32. The end portions 33 of the wire outside of the unit are brought close together and may be welded into one piece, if desired. The heater is supported on suitable standards or the like 34. These standards may be conveniently mounted on a base 35 on which may be placed a lamp 36 or other suitable heater adapted to heat the metallic heating member 32. By moving the lamp so that the flame may be applied at different points on the projecting end portions of the wire, the temperature of the heating element 31 may be varied and regulated at will. The heating unit 31 has an asbestos or other suitable insulation plug 37 fitted in the end thereof. The wire or strip 32 is passed through the plug 37 and is preferably carried to the end of the tube 31 and looped back, as shown. Obviously, the heat will be conducted from the ends of the wires 32 and into the heating unit 31. The apparatus is especially used where a supply of electric current is inaccessible.

In an apparatus arranged according to my invention the heating element may be placed near the point of application of the solution and thereby insure the proper maintenance of a uniform temperature.

Obviously, the apparatus admits of considerable modification without departing from my invention, and, therefore, I do not wish to be limited to the exact construction and arrangements shown.

What I claim as my invention and desire to secure by Letters Patent is:

1. In an apparatus of the character described, a base, standards thereon, a casing mounted on the standards, a heating chamber arranged in the casing and having one end thereof extending through an opening formed in one end of the casing, a heating unit having an exteriorly threaded enlargement at one end thereof for threaded engagement with said end of the heating chamber, an insulation plug secured in said end of the heating unit, a metallic strip formed in the shape of a loop and secured in said insulation plug so that its looped portion will extend on the inside of the heating unit, the free ends of said strip extending beyond the outer end of the insulation plug and overlying the base, and a source of heat mounted on the base beneath the free ends of said strips.

2. In an apparatus of the character described, a base, a casing, means for mounting said casing so that the same overlies the base in spaced relation thereto, a heating chamber arranged in the casing, a heating unit arranged in the heating chamber, and means for supplying heat to said heating unit composed of a metallic element one end of which projects in the interior of the heating unit and the opposite end of which overlies the base in spaced relation thereto, combined with a source of heat seating on the base beneath the last named end of said metallic element.

3. In an apparatus of the character described, a base, a casing, means for mounting said casing so that the same overlies the base in spaced relation thereto, a heating chamber within the casing, a heating unit in the heating chamber, and means for supplying heat to the interior of the heating unit, said means including a metallic part a portion of which extends on the interior of the heating chamber and a portion of which extends without the heating chamber, and a source of heat arranged to act on said last named portion of the metallic part.

Signed at St. Louis, Missouri, May 15th, 1908.

OSCAR H. ELBRECHT.

Witnesses:
G. A. PENNINGTON,
J. B. MEGOWN.